US010133875B2

(12) United States Patent
Pathak

(10) Patent No.: US 10,133,875 B2
(45) Date of Patent: Nov. 20, 2018

(54) DIGITAL RIGHTS MANAGEMENT SYSTEM IMPLEMENTING VERSION CONTROL

(71) Applicant: KONICA MINOLTA LABORATORY U.S.A., INC., San Mateo, CA (US)

(72) Inventor: Rabindra Pathak, San Jose, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 217 days.

(21) Appl. No.: 15/011,157

(22) Filed: Jan. 29, 2016

(65) Prior Publication Data
US 2017/0220814 A1 Aug. 3, 2017

(51) Int. Cl.
G06F 21/62 (2013.01)
G06F 21/31 (2013.01)

(52) U.S. Cl.
CPC .......... *G06F 21/6218* (2013.01); *G06F 21/31* (2013.01); *G06F 2221/2141* (2013.01)

(58) Field of Classification Search
CPC .............. G06F 21/6218; G06F 21/31; G06F 2221/2141
See application file for complete search history.

(56) References Cited

U.S. PATENT DOCUMENTS

| 8,266,245 B1* | 9/2012 | Saviano | G06F 21/6218 709/203 |
| 2003/0158831 A1* | 8/2003 | Zaremba | G06F 11/1448 |
| 2008/0201339 A1* | 8/2008 | McGrew | G06Q 50/18 |
| 2011/0004943 A1* | 1/2011 | Chaganti | H04L 29/06 726/30 |

FOREIGN PATENT DOCUMENTS

WO 2008034379 3/2008

OTHER PUBLICATIONS

Adobe Systems Incorporated, "Adobe LiveCycle ES3 Overview: Rights Management", http://help.adobe.com/en_US/ivecycle/10.0/Overview/WS92d06802c76abadb2c8525912ddcb9aad9-7ff8.html, 7 pages, printed from the internet on Apr. 15, 2014.

(Continued)

*Primary Examiner* — Jeffrey D. Popham
(74) *Attorney, Agent, or Firm* — Chen Yoshimura LLP

(57) ABSTRACT

A server in a digital rights management system implements version control for the digital documents being managed. Each document belongs to a document series and has a version number. The server maintains a version control database table that stores, for each document, the document series name and version number, and parameters indicating whether the document is obsoleted or deleted. When registering a new document, based on auto-obsolete and auto-delete parameters inputted by the user, the server automatically obsoletes or deletes certain older version documents that belong to the same series as the new document. The server controls access to the documents so that obsoleted documents will not be accessible to users even if they still have local copies of such documents. When a user requests access to an older version document that is not obsoleted, the server may allow access to the latest version document instead.

18 Claims, 7 Drawing Sheets

(56) References Cited

OTHER PUBLICATIONS

Adobe Systems Incorporated, "Programmatically applying policies", http://help.adobe.com/en_US/livecycle/10.0/Overview/WSb96e41f8a4ca47a9-4882aeb5131190eddba-8000.html, 1 page, printed from the internet on Apr. 9, 2014.
Adobe Systems Incorporated, "LiveCycle® ES Java™ API Reference", http://livedocs.adobe.com/livecycle/es/sdkHelp/programmer/javadoc/index.html, 3 pages, printed from the internet on Apr. 9, 2014.
Microsoft, "Active Directory Rights Management Services", http://technet.microsoft.com/en-us/windowsserver/dd448611.aspx, 2 pages, printed from the internet on Nov. 10, 2014.
Microsoft, "AD RMS Overview", http://msdn.microsoft.com/library/cc530389(Vs.85).aspx, 6 pages, printed from the internet on Nov. 10, 2014.
Microsoft, "Using the AD RMS SDK", http://msdn.microsoft.com/en-us/library/cc542552(v=vs.85).aspx, 1 page, printed from the internet on Nov. 10, 2014.
Microsoft, "AD RMS Documentation Roadmap", http://technet.microsoft.com/en-us/library/dd772711.aspx, 3 pages, printed from the internet on Nov. 10, 2014.

* cited by examiner

| Permission Policy ID | User ID | Read | Print | Copy | ... ... |
|---|---|---|---|---|---|
| P1 | U1 | Yes | Yes | Yes | |
| | U2 | Yes | No | No | |
| | U3 | Yes | Yes | No | |
| P2 | U1 | Yes | Yes | Yes | |
| | U2 | Yes | Yes | No | |
| P3 | U2 | Yes | No | No | |
| | U4 | Yes | Yes | Yes | |
| | U5 | Yes | Yes | No | |
| ... | | | | | |

| Doc ID | Permission Policy ID |
|---|---|
| D1 | P1 |
| D2 | P4 |
| D3 | P10 |
| D4 | P7 |
| ... | |

| Doc ID | File Name | Version Number | Doc Series Name | Permission Policy ID | Location | Shared Users |
|---|---|---|---|---|---|---|
| D1 | Doc_A | 1 | Series_a | P1 | L1 | U1, U2, U3 |
| D2 | Doc_B | 2 | Series_a | P4 | L1 | U1, U2, U3 |
| D3 | Doc_A | 3 | Series_a | P10 | L1 | U1, U3 |
| D4 | Doc_C | 1 | Series_b | P7 | L2 | U4, U5 |
| ... | ... ... | | | | | |

| Obsoleted | Deleted | Auto-Update | Auto-Delete Older Versions | Auto-Obsolete Older Versions | Allow Open From Older Versions | Linked Versions | ... |
|---|---|---|---|---|---|---|---|
| Yes | Yes | No | No | No | Yes | 3 | |
| Yes | No | No | Yes | No | Yes | 3 | |
| No | No | Yes | No | Yes | yes | 3 | |
| No | No | Yes | No | Yes | Yes | 2 | |
| ... | | | | | | | |

| Fig. 4A | Fig. 4B |
|---|---|

| User | Rights for Ver1 | Rights for Ver2 | Rights for Ver3 | Allow Opening From Older Version (for Ver3) | Version requested to be opened | Version actually opened |
|---|---|---|---|---|---|---|
| U1 | Yes | Yes | Yes | Yes | Ver1 | Ver3 |
| | | | | | Ver2 | Ver3 |
| | | | | No | Ver1 | Ver1 |
| | | | | | Ver2 | Ver2 |
| U2 | No | Yes | Yes | Yes | Ver1 | Ver3 |
| | | | | | Ver2 | Ver3 |
| | | | | No | Ver1 | Error msg |
| | | | | | Ver2 | Ver2 |
| U3 | No | No | Yes | Yes | Ver1 | Ver3 |
| | | | | | Ver2 | Ver3 |
| | | | | No | Ver1 | Error msg |
| | | | | | Ver2 | Error msg |
| U4 | Yes | No | Yes | Yes | Ver1 | Ver3 |
| | | | | | Ver2 | Ver3 |
| | | | | No | Ver1 | Ver1 |
| | | | | | Ver2 | Error msg |
| U5 | Yes | Yes | No | Yes | Ver1 | Ver1 |
| | | | | | Ver2 | Ver2 |
| | | | | No | Ver1 | Ver1 |
| | | | | | Ver2 | Ver2 |
| U6 | Yes | No | No | Yes | Ver1 | Ver1 |
| | | | | | Ver2 | Error msg |
| | | | | No | Ver1 | Ver1 |
| | | | | | Ver2 | Error msg |
| U7 | No | Yes | No | Yes | Ver1 | Error msg |
| | | | | | Ver2 | Ver2 |
| | | | | No | Ver1 | Error msg |
| | | | | | Ver2 | Ver2 |

Fig. 7

DIGITAL RIGHTS MANAGEMENT SYSTEM IMPLEMENTING VERSION CONTROL

BACKGROUND OF THE INVENTION

Field of the Invention

This invention relates to a digital rights management system, and in particular, it relates to a digital rights management system that implements version control for the digital documents being managed.

Description of Related Art

Documents traditionally available only in hard copies are increasingly also available in digital copies. In fact many documents nowadays are prepared, generated, stored, distributed, accessed, read or otherwise used electronically in digital file formats such as the Portable Document Format (PDF). With the wide use of digital documents and digital document processing, digital rights management systems ("DRM" or "RMS") are increasingly implemented to control user access and prevent unauthorized use of digital documents. The rights involved in using a digital document may include the right to view (or "read") the digital document, the right to edit (or "write") the digital document, the right to print the digital document in hard copies, the right to copy the digital document, etc. A user may access a digital document by acquiring (or being assigned) one or more of these rights.

DRM systems are generally implemented for managing users' rights to the digital documents stored in the systems. In a current DRM system, each digital document is associated with a rights management policy (or simply referred to as policy in this disclosure) that specifies which user has what rights to the document, as well as other parameters relating to access rights. Many such policies are stored in a DRM server (also called RMS server). The server also stores a database table that associates each document (e.g. by a unique ID, referred to as document ID or license ID) with a policy (e.g. by policy ID). Each digital document may also have metadata that contains the document ID. When a user attempts to access a document (either a document residing on a server or a document that has been downloaded or copied to the user's computer) using an application program such as Adobe™ or Acrobat™ or Acrobat™ Reader™, the application program on the client computer contacts the RMS server to request permission. The server determines whether the requesting user has the right to access the document in the attempted manner (view, edit, print, etc.), by determining the policy associated with the document and then referring to the content of that policy. The server then transmits an appropriate reply to the application program to grant or deny the access. If access is granted, the server's reply may contain a decryption key for the client computer to decrypt the document.

The description herein of the structures, functions, interfaces and other relevant features, such as digital rights policies, application programming interface (API) for rights management and policies, etc., of existing DRM systems may at times incorporates, references or otherwise uses certain information, documents and materials from publicly and readily available and accessible public information, e.g., for Adobe™ LiveCycle™: "Rights Management" (URL http://help.adobe.com/en_US/livecycle/10.0/Overview/WS92d06802c76abadb2c8525912ddcb9a ad9-7ff8.html), "Programmatically applying policies (a subsection of 'Rights Management')", (URL http://help.adobe.com/en_US/livecycle/10.0/Overview/WSb96e41f8a4ca47a9-4882aeb5131190eddba-8000.html), "LiveCycle® ES Java™ API Reference" (URL http://livedocs.adobe.com/livecycle/es/sdkHelp/programmer/javadoc/index.html), etc. The Microsoft™ ADRMS system is also a digital rights management system.

As digital information (e.g., digital documents) sharing across outside enterprise and within enterprise is exploding, it is increasingly harder to manage different versions of the digital documents after they are distributed to many users. Some systems provide mechanisms to replace older versions of documents. For example, patent application WO/2008/034379 describes "A method and system for exchanging version object in digital version managing system are provided to solve the problem of that the prior art of DRM can not complete exchanging version object in one interactive process. The method comprises: the digital version management proxy module of client sends one version exchange request message carrying at least one original version object information and at least one target version object information to the version center, the version center, based on received version exchange request message, decides to exchange version objects and generates version exchange response message, the version center sends version exchange response message to the digit version management proxy module, the digit version management proxy module, based on received version exchange response message, replaces the original version object, or keeps the original version object."(Abstract.)

SUMMARY

The present invention is directed to a method and related apparatus that implements automatic version control in a DRM system.

An object of the present invention is to provide a version control method that gives the user more flexibility in accessing different versions of documents.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a digital rights management method implemented in a server of a digital right management (DRM) system, which includes: (a) storing a plurality of documents in a document storage; (b) maintaining a version control database table which includes a plurality of entries, at least some of the entries each corresponding to a document stored in the document storage, each entry of the table including: a unique document identification (ID), a name of a document series which the document belongs to, a version number within the document series, an obsoleted parameter indicating whether the document is obsoleted, and a deleted parameter indicating whether the document is deleted; (c) receiving a document registration request from a first user to register a new document, the document registration request including, for the new document, a name of a document series which the new document belongs to, a version number within the document series, an auto-obsolete parameter indicating which older version documents in the same document series are to be obsoleted, and an auto-delete parameter indicating which older version documents in the same document series are to be deleted; (d) creating a new entry for the new document in the version control database table to store a document ID for the new document, the name of the document series, and the version number received in step (c); (e) based on the auto-obsolete parameter for the new document received in step (c), modifying one or more existing entries of the version control database table which correspond to one or more documents in the document series of the new document that are indicated by the auto-obsolete parameter, to set their obsoleted parameters to a value indicating that they are obsoleted; and (f) based on the auto-delete parameter for the new document received in step (c), modifying one or more existing entries of the version control database table which correspond to one or more documents in the document series of the new document that are indicated by the auto-delete parameter, to set their deleted parameters to a value indicating that they are deleted, and deleting such one or more documents from the document storage.

In one embodiment, in step (b) each entry of the version control database table further includes a linking parameter indicating whether the new document may be permitted to be accessed in response to a document access request that requests access to one or more older version documents in the same document series and a maximum version difference between the latest version and the older version from which the latest version may be permitted to be accessed, wherein in step (c) the document registration request further includes a linking parameter for the new document, and wherein step (d) further includes storing the linking parameter received in step (c) in the new entry of the version control database table.

The method may further include: (h) receiving a document access request from a second user to access a document, the document access request including a document ID which identifies the requested document; and (i) referring to the version control database table using the document ID to determine whether the obsoleted parameter corresponding to the document ID indicates that the requested document has been obsoleted, and if so, transmitting a response to the second user to deny access to the requested document.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 2 schematically illustrates an example of a permission policy table maintained by the RMS server.

FIG. 3 schematically illustrates an example of a document—permission policy association table maintained by the RMS server.

FIGS. 4A and 4B schematically illustrate an example of a version control database table maintained by the RMS server.

FIG. 7 schematically illustrates examples of determining the RMS server's response when a user requests to access an older version document, based on the version control policy and user's access rights to the older and latest versions.

DETAILED DESCRIPTION OF PREFERRED EMBODIMENTS

In embodiments of the present invention, the DRM system manages version control by notifying users to download a new version of a document, and controlling user access to the old versions. In one embodiment, the client computer of the user will have both the new and the old versions of the document, but old versions will be inaccessible because access to old versions will be denied by the DRM system. In another embodiment of the present invention, the DRM system will grant a user access to multiple different versions of the document.

Figure 1:
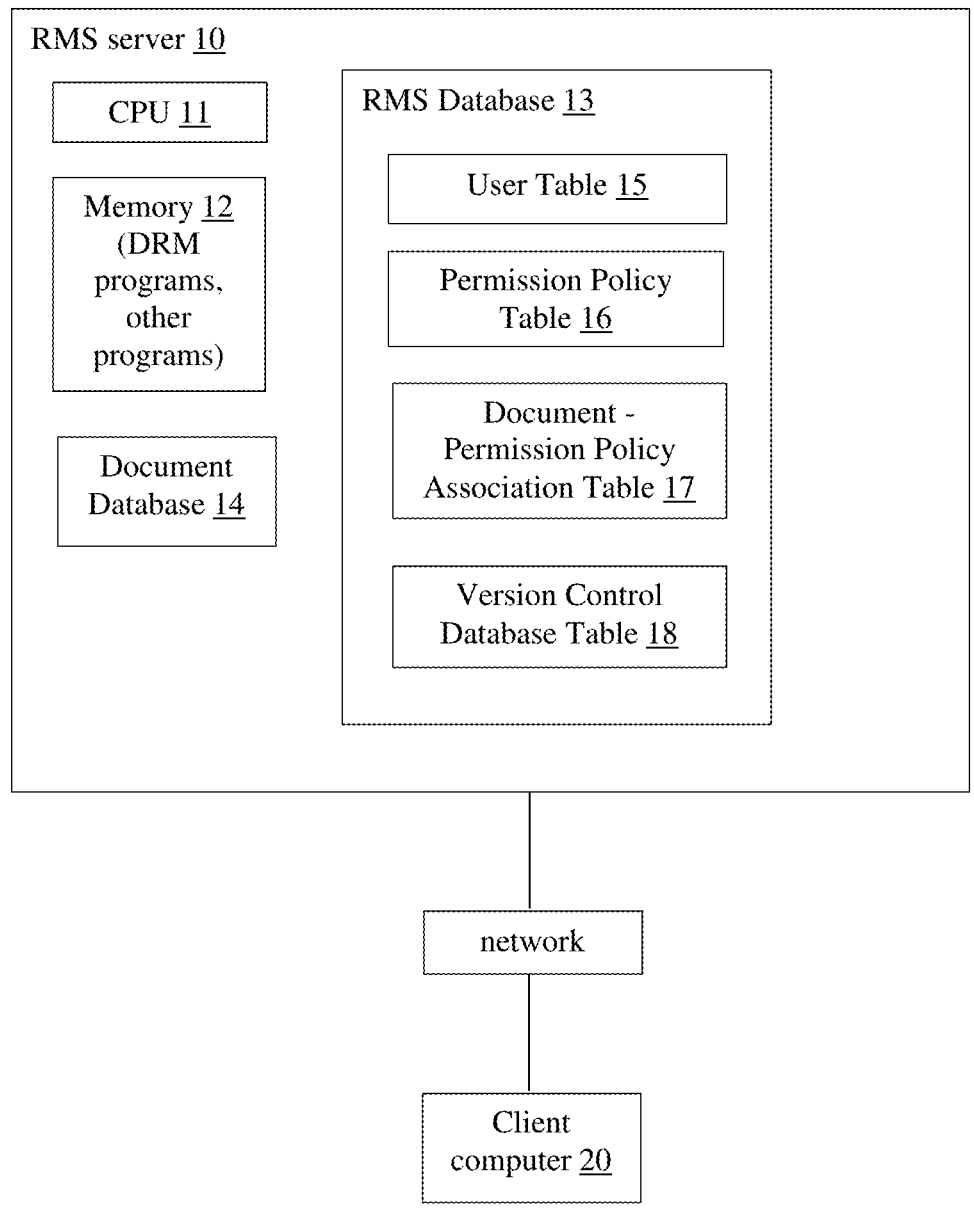
FIG. 1 schematically illustrates a digital rights management (DRM) system including a rights management server (RMS server) according to embodiments of the present invention.

FIG. 1 schematically illustrates a digital rights management (DRM) system that includes a digital rights management server (RMS server) 10 connected via a network to one or more client devices 20 such as client computers, tablets, smart phones, etc. The client devices 20 are devices used by users to interact with the RMS server 10 to gain access to protected documents or to register documents in the DRM system. The client device contains client software such as web browsers, Adobe™ Acrobat™, etc.

The RMS server 10 includes hardware such as a CPU 11 for executing DRM programs stored in a memory 12 to perform various DRM functions described below. The RMS server 10 maintains a DRM database 13 which contains various DRM database tables, including a user table 15, a permission policy table 16, a document—permission policy association table 17, and a version control database table 18. The RMS server 10 also maintains a document database 14 which stores copies of the digital documents managed by the system (referred to as protected documents).

The user table 15 stores a list of user IDs for users who are registered with the DRM system, along with relevant information about the users such as their email addresses, etc.

FIG. 2 schematically illustrates an example of the permission policy table 16 maintained by the RMS server 10. The permission policy table 16 defines a plurality of permission policies, each identified by a permission policy ID, such as "P1", "P2", etc. in the illustrated example. The permission policy IDs uniquely identifies the permission policies and can be referred to from other tables. Each permission policy contains information about the permissions (i.e. rights) granted to one or more users (as identified by the user IDs) to take one or more actions on a document. The permitted actions include, for example, read, print, or copy a document.

FIG. 3 schematically illustrates an example of the document—permission policy association table 17 maintained by the RMS server 10. The document—permission policy association table 17 defines, for each document managed by the DRM system (as identified by a unique document ID), the permission policy (as identified by the permission policy ID) that is associated with the document. Each document is associated with one existing permission policy. In other words, the user access permissions for each document are defined by the associated permission policy. The document—permission policy association table 17 is optional because the same information is also contained in the version control database table 18.

The permission policy table 16 and the document—permission policy association table 17 can be used to determine whether a user has particular access rights (read, etc.) to a given document. More specifically, for a given document, the RMS server refers to the document-permission policy association table 17 to determine the permission policy associated with the document, then refers to the permission policy table 16 to determine whether a particular user has particular access right to the document. In an alternative implementation, in lieu of the permission policy table 16 and the document—permission policy association table 17, the RMS database includes a user-centric permission table (not shown in the drawings) which specifies, for each user, what kind of access rights (read, etc.) the user has for which documents.

The version control database table 18 stores information pertinent to performing automatic document version control according to embodiments of the present invention. An example of the version control database table 18 is shown in FIGS. 4A and 4B. Each entry of the version control database table 18 corresponds to one document identified by the document ID. In the DRM system, a new version of an existing document is assigned a new document ID different from those of the existing older version documents. Each document belongs to a document series, and different documents within the same document series are referred to as different versions in a document series, or sometimes referred to as different "versions of a document" for convenience but it should be understood that these documents all have different document IDs.

Each entry of the version control database table 18 includes a document ID, a file name, a version number, a document series name, a location where the document is stored, an "Obsoleted" parameter which indicate whether the document has been obsoleted (explained in more detail later), an "Deleted" parameter which indicate whether the document has been deleted (explained in more detail later), a shared user list which lists all users granted access to the document, and "Auto-Update", "Auto-Delete Older Versions" and "Auto-Obsolete Older Versions" parameters which will be explained later. The version control database table 18 includes additional parameters (some are not shown in the drawings) which will be explained later.

The DRM program includes a version control service which performs two main functions. The first function is performed when a new version of the document is published (i.e. registered), to process older versions of the new document (i.e. documents in the same document series but have lower version numbers). When the RMS server receives a request from a client to publish a new document, the RMS server performs a document registration process, including adding a copy of the document (after encryption) to the document database 14 and adding an entry for the document in the version control database table 18. The RMS also adds an entry for the document in the document—permission policy association table 17 if this table is maintained. In addition, the version control service processes older versions of the new document, including obsoleting the older version (using an auto-obsolete service of the DRM program), and/or deleting the older version (using an auto-delete service of the DRM program). The RMS server can also share the newly published document with users (using an auto-update service of the DRM program).

The auto-delete service checks the version control database table 18 to determine if the "auto-delete older versions" parameter for the new document is set to "Yes". If it is, then this service will delete the old version documents from the document database 14 and change the "Deleted" parameter for older versions of this document in the database table 18 to "Yes".

The auto-obsolete service checks the version control database table 18 to determine if "auto-obsolete older versions" parameter for the new document is set to "Yes". If it is, then this service will change the "Obsoleted" parameters for older versions of this document in the database table 18 to "Yes". After an older version document is obsoleted, even if users still have copies of such documents on the client computers, the users will not be able to open the document. Rather, when they try to open the document, they will receive an error message advising them that the document can no longer be accessed.

In an alternative embodiment, the "auto-delete older versions" parameter in the version control database table 18 may have a numerical value which indicates older versions of how many versions before will be deleted. For example, if the "auto-delete older versions" parameter is set to "3", then only the document that is three versions before the current version and versions older than that will be automatically deleted by the auto-delete service. In another alternative embodiment, the "auto-delete older versions" parameter may contain multiple numerical values to indicate which specific older versions will be automatically deleted. For example, if the parameter has values "1, 3", than only documents that are one version older and three versions older than the current version will be automatically deleted obsoleted while the document that is two versions older will not. The "auto-obsolete older versions" parameter may similarly be given such numerical values.

The auto-update service checks the version control database table 18 to determine if the "auto update" parameter for the new document is set to "Yes". If it is, then this service will check the list of "shared users" for the document in the version control database table 18, and send a notification containing a download link (linking to the storage location of the document) to all the shared users to notify them to download the updated version. The users can use the link to download the newly published document (i.e. the latest version) if they choose to. Preferably, this notification is a one-time event which occurs only at the time of publication of a new document.

The second main function of the version control service is performed when a user requests access to a document. When the RMS server receives a request from a user to access a document, the RMS server performs a permission checking process to determine whether the user has access to the requested document, e.g., by checking the document—permission policy association table 17 and the permission policy table 16. Meanwhile, the version control service checks the "Obsoleted" parameter in the version control database table 18 to verify whether the document has been obsoleted. If the document has been obsoleted, then the user is denied permission to access the document regardless of the result of the permission checking process. If the document has not been obsoleted, then the user may be granted access depending on the result of the permission checking process.

Figure 5:
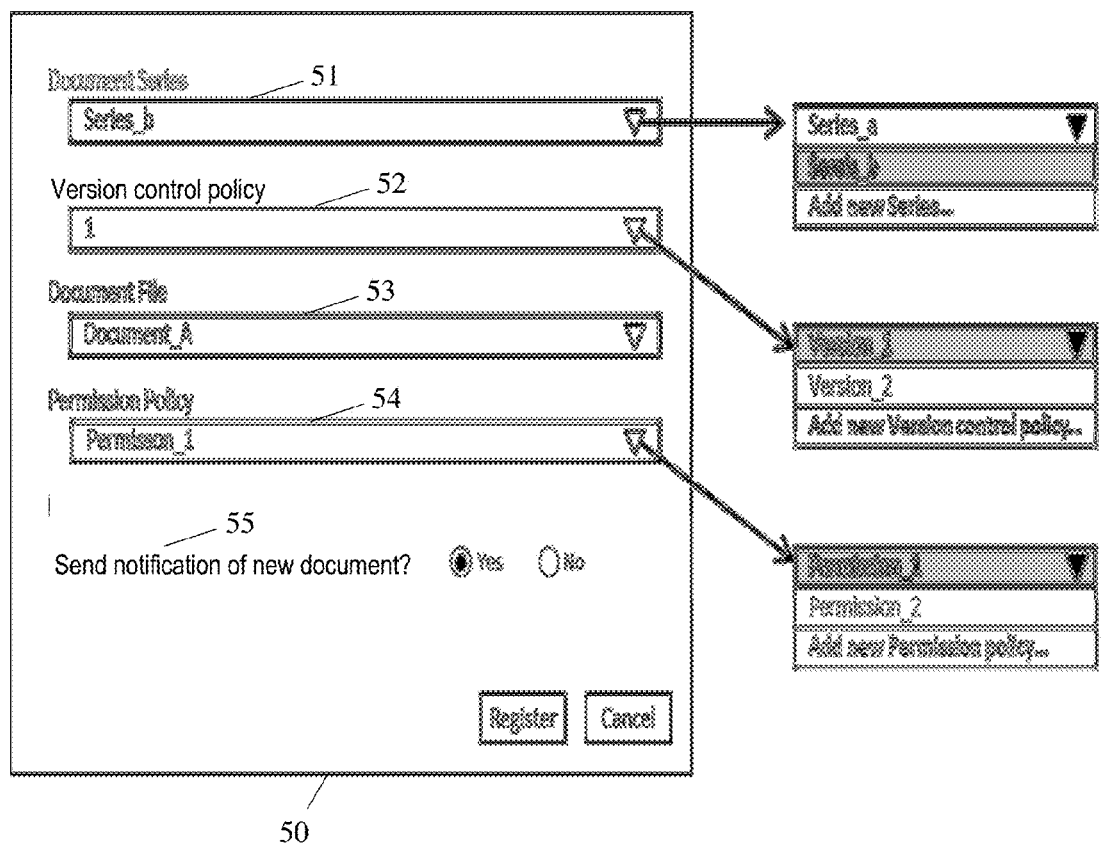
FIGS. 5 and 6 schematically illustrate user interface (UI) displayed to a document publisher for specifying version control policy parameters when publishing a new document in the DRM system.

To facilitate publication of a document and version control, the RMS server uses a graphical user interface (UI) to interact with the user who wishes to publish a document. FIG. 5 schematically illustrates an exemplary UI screen 50 displayed to the user for this purpose. As shown in FIG. 5, the UI 50 prompts the user to enter various information, including a document series name 51, version control policy 52, file name for the document 53, permission policy ID 54 to be associated with the document, and whether to send notification of the new document to the users (auto-update) 55. The field 51 of the UI allows the user to select an existing document series or create a new document series (for example, using a drop-down list as shown in FIG. 5). If the user chooses to create a new document series, the RMS server will assign version number 1 in that series to the new document, and displays a subsequent UI screen to prompt the user to input a document series name and parameters of the version control policy.

If the user chooses one of the existing document series in the document series field 51, the RMS server will assign the appropriate version number in that series to the new document. The version number is assigned in a sequential manner. The user then specifies, using the input field 52, whether the version control policy parameters for a previous version of the same series are to be adopted for the new document (the user uses the drop-down menu to select the older version from which the parameters are to be adopted), or whether new version control policy parameters are to be inputted ("Add new version control policy" in the drop-down menu). If the user chooses to adopt the version control policy parameters from a previous version of the same series, the parameters from the specified older version will be copied to the latest version in the version control database table 18. If new version control policy parameters are to be inputted, the RMS server displays a subsequent UI screen to prompt the user to input parameters of the version control policy.

Figure 6:
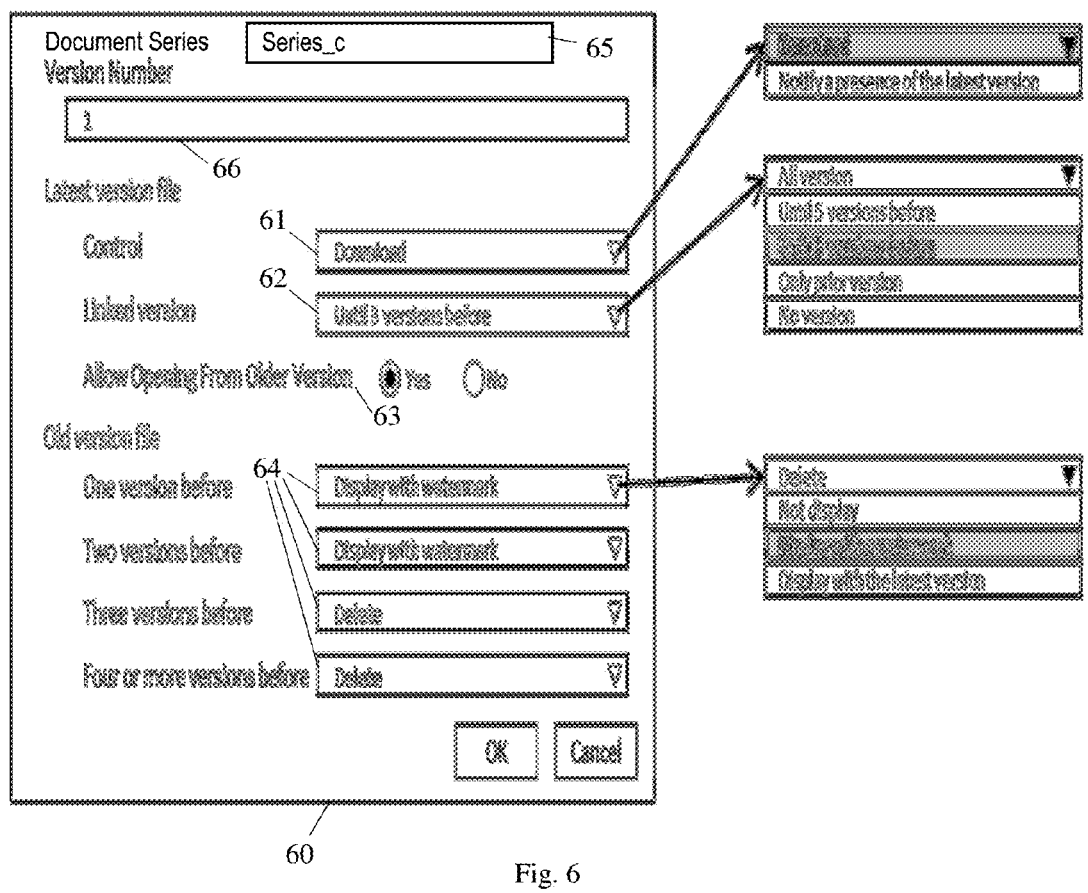

FIG. 6 schematically illustrates an example of a subsequent UI screen 60 for the user to enter version control policy parameters, either when the user chooses to add a new document series in the field 51 or when the user chooses to add new version control policy in the field 52. As shown in FIG. 6, the UI 60 has a "Document Series" field 65 which shows the document series name (if the user chose an existing document series) or is used by the user to input the document series name (if the user chose to create a new document series). The UI 60 also has a "Version Number" field 66 which shows the version number of the new document in the document series. The version number is 1 if it is a new document series.

The UI 60 allows the user to input various version control policy parameters. The parameter labeled "Control" 61 specifies the manner of the RMS server's response when a user requests to open an older version in a document series but the server offers the user the latest version; possible values of the parameter include "download" (which means the latest version will be automatically downloaded to the user's computer), and "Notify presence of latest version" (which means the system will notify the user that a newer version of the requested document exists, and provide a link for downloading it).

The parameter "Allow Opening From Older Version" 63 is a parameter used to determine the RMS server's response when the user requests to open an older version, and its value can be set to Yes or No. When the user requests to open an older version, and if the older version has not been obsoleted, then the RMS server's response may be to open the older version that is requested, or to open the latest version instead, or to deny access to both the older version and the latest version. The response is determined by a combination of the following parameters: The user's access right for the requested older version, the user's access right for the latest version, and the setting of the "Allow Opening From Older Version" parameter for the latest version in the database table 18 (corresponding to the parameter 63 shown in FIG. 6). The determination rules (referred to as the "open from older version" determination rules) are:

1. If the Allow Opening From Older Version parameter is Yes and the user has access right to open the latest version, then the latest version is opened regardless of whether the user has access rights to open the requested older version.

2. If the Allow Opening From Older Version parameter is set to Yes and the user does not have access rights to open the latest version, then the requested older version is opened if the user has access right to open that version; but if the user does not have access rights to open the requested older version, then an error message is displayed to inform the user that he does not have permission to open the document.

3. If the Allow Opening From Older Version parameter is set to No, the newest version will not be opened regardless of whether the user has access rights to it; the requested older version is opened if the user has access rights to open that version, but an error message is displayed if the user does not have access rights to open the older version.

FIG. 7 shows examples of some combinations of parameters and the resulting server responses by applying the above determination rules. The second to fourth columns are the user's access rights with respect to each version. The fifth column is the "Allow Opening From Older Version" (corresponding to the parameter 63 in FIG. 6). The sixth column is the version that the user requests to open, and the seventh column is the version that is actually opened. In these examples the latest version is version 3 (Ver3).

It should be noted that when the server response is "open the latest version" as determined by the above rules, the server may either automatically download the document to the client computer or notify the user of the presence of the latest version, depending on the setting of the "Control" parameter 61 in the UI 60.

When applying the above determination rules, the user's access right for the requested older version and the latest version are determined from the document—permission policy association table 17 and the permission policy table 16, or from the user-centric permission table, in the manner described earlier. Since different versions are independent documents with unique document IDs in the DRM system, they can have different user access rights associated with them.

Note that, as described earlier, if the older version document has been obsoleted as indicated by the "Obsoleted" parameter in the version control database table 18, then the user will be denied access; in this case, the above "open from older version" determination rules will not be applied and the server will directly deny the access request.

Referring back to the UI 60 shown in FIG. 6, the parameter labeled "Linked Versions" 62 specifies the maximum version difference between the latest version and the previous versions from which the latest version can be opened. For example, if the "Linked Versions" value is 3, then when the user requests to open one of the 3 most recent previous versions, then the server's response will be determine by applying the above determination rules; but if the user requests to open a version that is older than the 3 most recent previous versions, the server will not send a notification about the latest version or performing an automatic download. Note that if the "linked versions" number is set to "No version", then the effect is the same as setting "Allow Opening From Older Version" to "No", so the two parameters may be combined into one. The "Allow Opening From Older Version" and the "Linked Versions" parameters are referred to as the "linking parameter" for convenience.

In the UI 60, the set of parameters 64 under "Older version file" specify the treatment of some older versions of this document series. In this example, for each older version, the parameter can be set to "Delete", "Not display", "Display with watermark", or "Display with the latest version". "Delete" corresponds to deleting the older version; "Not display" corresponds to obsoleting the older version. In the example shown in FIG. 6, the UI allows the user to specify the treatment of individual older versions independently, for example, the "one version before" can be set to "Delete" and the "two versions before" can be set to "Not display". In an alternative embodiment, the UI allows the user to specify "delete how many versions before" and "obsolete how many versions before". These settings will be stored in the "Auto-Delete Older Version" and "Auto-Obsolete Older Version" parameters for the new document in the version control database table 18, in the manners described earlier.

Referring back to FIG. 5, the "Permission Policy" field 54 of the UI 50 prompts the user to specify a permission policy to be associated with the new document. The user may either select an existing permission policy, or create a new permission policy, in which case a subsequent UI (not shown) will be displayed to allow the user to specify the terms of the new permission policy. The newly created permission policy will be stored in the permission policy table 16.

The "Send notification to users?" field 55 specifies whether the RMS server will send a notification to all users who are given access to the new document to notify them that the new document has been published. This corresponds to the "Auto-Update" parameter for the newly published document in the version control database table 18.

The parameters inputted in the UI 50 and UI 60 are stored in the version control database table 18 to be used for various version control functions (not all parameters are illustrated in the table 18 in FIGS. 4A and 4B).

In one embodiment, each permission policy has a parameter that specifies whether version control is mandatory or optional. When a user publishes a document, the user specifies a permission policy to be associated with the document; if the permission policy mandates version control, the RMS server will require the user to select a document series and input parameters for a version control policy (for example, by using a UI similar to that shown in FIG. 6). When the permission policy specifies optional version control, then it is optional for the user to select a document series and input parameters for a version control policy.

Figure 8:
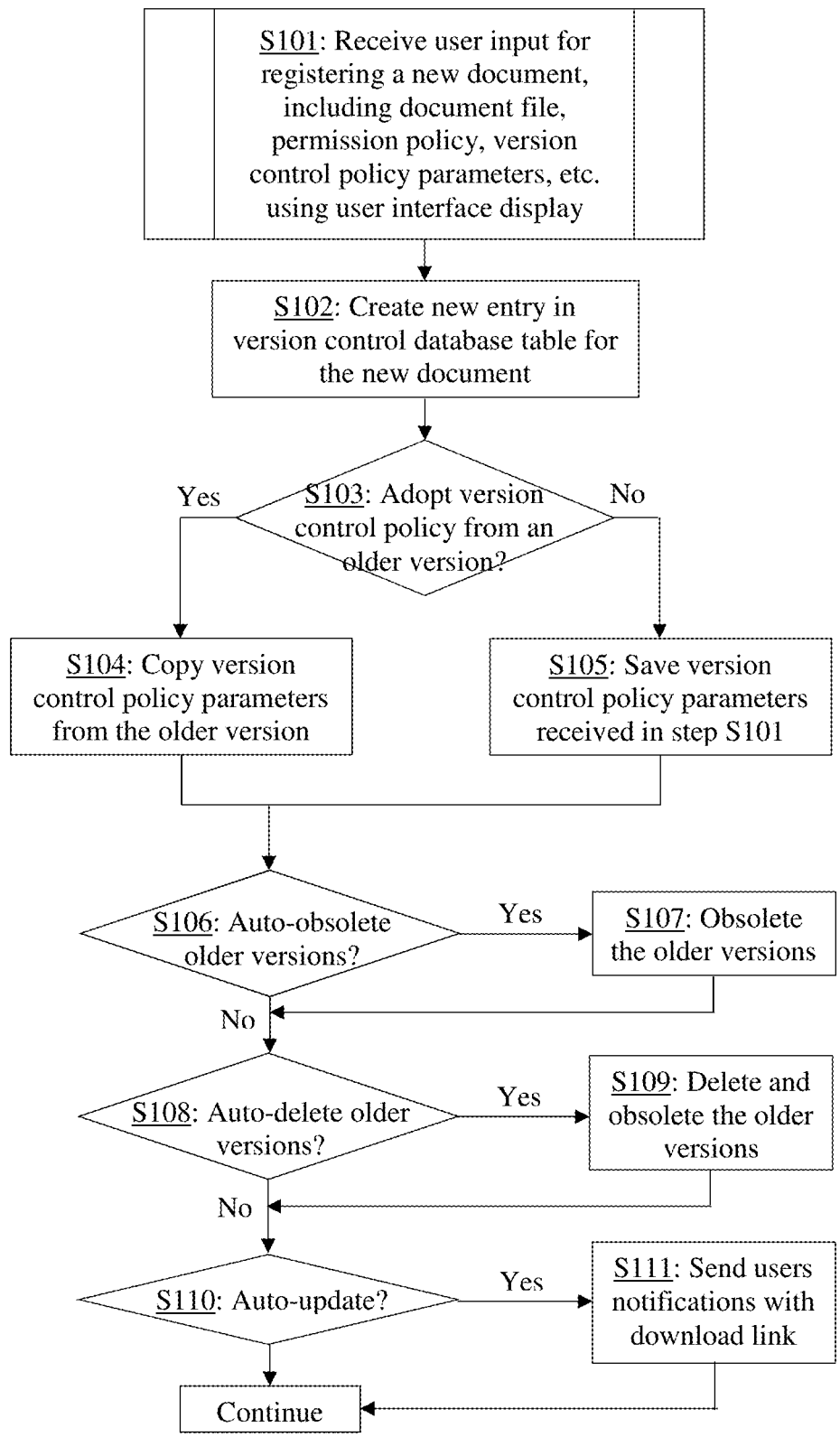
FIG. 8 is a flowchart that schematically illustrates a method executed by the RMS server when publishing a new document according to an embodiment of the present invention.

FIG. 8 schematically illustrates a process executed by the RMS server when publishing a document. In step S101, the RMS server receive user input for registering a new document, including a document file name, permission policy to be associated with the document, version control policy parameters including document series name, version number, "auto-delete older versions", "auto-obsolete older versions", and "auto-update", etc., using an interactive UI display such as that shown in FIGS. 5 and 6 or other suitable UI displays.

The RMS server creates a new entry for the new document in the version control database table 18 and stores in it the document ID, file name, document series name, version number, and permission policy (step S102). This step includes generating the globally unique document ID. In this step, the server also obtains a list of users having access to the document from the associated permission policy and copies them to the "Shared Users" field of the version control database table 18. If the use has chosen an existing document series and chosen to adopt version control policy parameters from an older version in the series ("Yes" in step S103), the server copies the version control policy parameters from that older version to the new document in the version control database table 18 (step S104). Otherwise ("No" in step S103), the server saves the version control policy parameters for the new document, which are received in step S101, in the version control database table 18 (step S105). The version control policy parameters include "auto-delete older versions", "auto-obsolete older versions", "auto-update", "allow open from older versions", "linked versions", etc., and other suitable version control parameters.

In step S102, the RMS server also creates an entry for the new document the document-permission policy association table 17 to associate the document with the permission policy specified by the user.

The RMS server performs steps S106 to S109 to update the older versions of the same document series based on the version control policy parameters stored in the version control database table 18. If the "Auto-obsolete older version" parameter is set to obsolete some of the older versions ("Yes" in step S106), then the server obsoletes the specified older versions by setting the "Obsoleted" parameter in the version control database table 18 for the specified older version to "Yes" (step S107). If the "Auto-delete older version" parameter is set to delete some of the older versions ("Yes" in step S108), then the server deletes the specified older version documents from the DRM database and also updates the "Deleted" as well as the "Obsoleted" parameters in the version control database table 18 for these older versions to "Yes" (step S109).

Then, if the "Auto-update" parameter is set to "Yes" ("Yes" in step S110), the server sends a notification to all "Shared Users" who have access to the latest version document (step S111). The notification may include a link for downloading the document.

The RMS server also performs other necessary steps for publishing a document, including encrypting the document and saving the encrypted document in the DRM database. These steps are similar to the steps performed in conventional DRM systems.

In an alternative embodiment, the auto-obsolete and auto-delete parameters do not need to be stored in the version control database table 18; the server will use these parameters as they are received from the user via the UI to perform the auto-obsolete and auto-delete steps S106 and S108. An advantage of storing the auto-obsolete and auto-delete parameters in the version control database table 18 is that these parameters can be copied from one version to another in the database table when the user registers a later version of the document.

Figure 9:
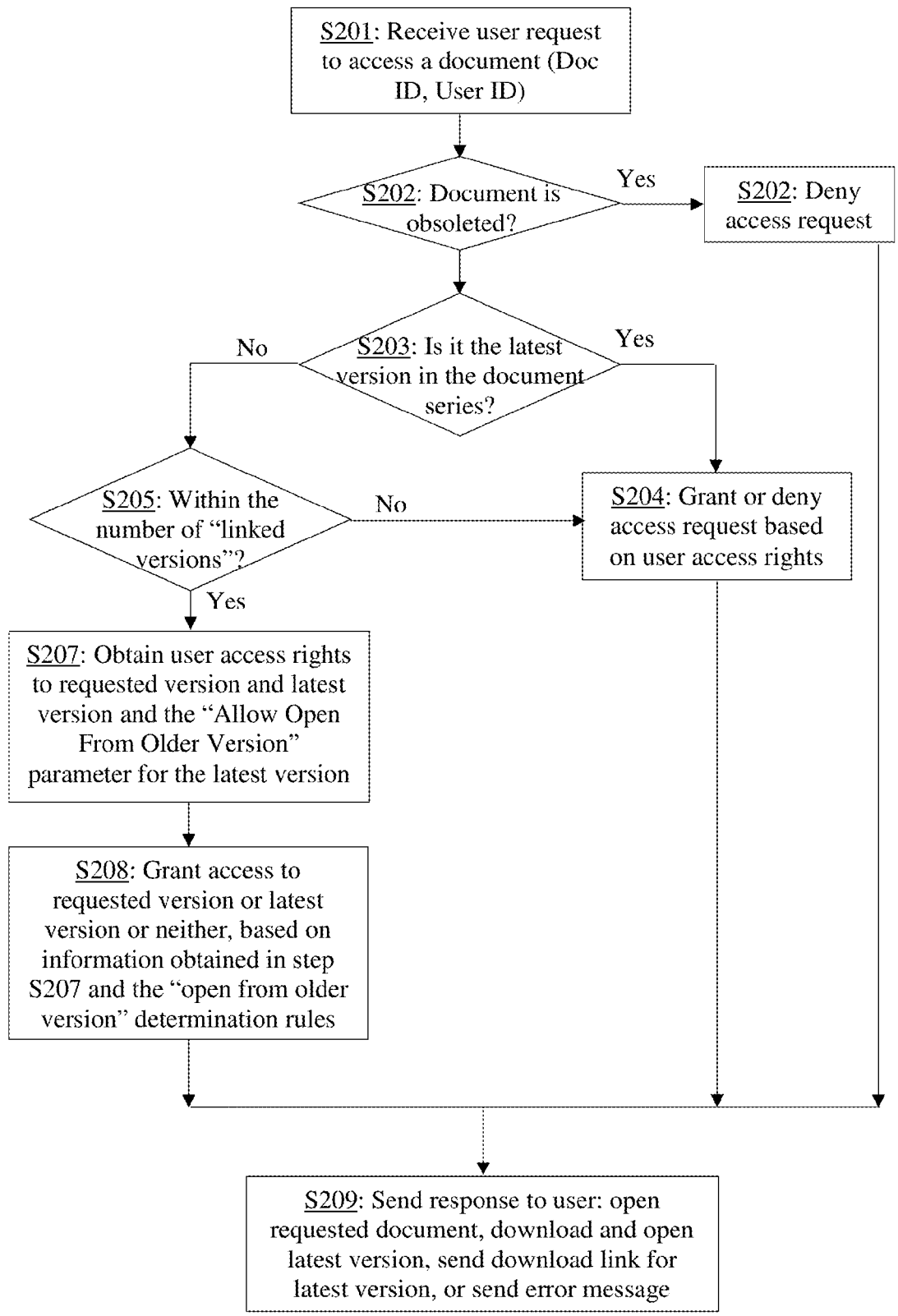
FIG. 9 is a flowchart that schematically illustrates a method executed by the RMS server when processing a document access request according to an embodiment of the present invention.

FIG. 9 schematically illustrates a process executed by the RMS server when responding to a user request to access a document. The request includes a document ID and a user ID (step S201). By referring to the version control database table 18 using the document ID, the server determines whether the document is obsoleted (whether its "Obsoleted"

parameter is set to "Yes") (step S202). If it is, the server will deny access to the document (step S202). If the document is not obsoleted, the server then obtains the series name and version number of the document, and determines whether the document is the latest version in the document series (step S203). If it is ("Yes" in step 203), the server determines the user's access rights to this document and based on such rights, either grants or denies the document access request (step S204). The user's access rights to the document may be determined by first referring to the document—permission policy association table 17 or the version control database table 18 to determine the permission policy associated with the document, and then referring to the permission policy table 16 to determine the user's access rights. If the DRM database stores other tables that define user's access rights, these other tables may be referred to as well or instead.

If the requested document is not the latest version in the document series ("No" in step 203), the server determines (by referring to the version control database table 18) whether the requested document is within the number of versions specified in the "Linked Versions" parameter of the latest version (step S205). If it is not ("No" in step 205), the server grants or denies the access request based on the user's access rights to the document (step S204). If it is ("Yes" in step 205), the server obtains the user's access rights to the requested document (the older version), the user's access rights to the latest version, and the "Allow Open From Older Version" parameter for the latest version (from the version control database table 18) (step S207). Based on the information obtained in step S207, the server grants access to the requested older version, or the latest version, or neither, using the "open from older version" determination rules described earlier (step S208). Based on the results of the various determination steps S202, S204 and S208, the server sends a response to the user, which may be to open the requested document, to download and open the latest version document, to send a notification with download link for the latest version document, or to send an error message without opening any document (step S209).

Note that the relevant application programs on the user's computer (client 20) do not need to be modified to implement the above-described version control methods. When publishing a document, the user interacts with the RMS server via the web-based user interface using a browser program. When requesting to access a document, the user sends the document access request in the same manner as in conventional DRM systems (e.g. by attempting to open a PDF document); if the user receives a download link for the latest version document, the user can choose to click on the link to download the latest version.

In one embodiment, the application program on the client does not overwrite or delete the locally stored older version after downloading the latest version. Thus, both the older version and the latest version of the document will be stored on the client computer.

In an alternative embodiment, the application program on the client is modified so that when the user attempts to access a locally stored older version document but the server determines that a newer version exists in the DRM system, the server may instruct the client's application program to delete the locally stored older version document. For example, the server may include such an instruction in step S208 if the Auto-Delete Older Version parameter for the document is set to Yes. This may be accomplished, for example, by providing a plug-in program on the client computer.

In summary, the version control method according to embodiments of the present invention has the following features:

Auto obsolescence is implemented to make older versions of RMS managed documents obsolete. Obsoleted document are inaccessible to users but they are not deleted from the storage of the DRM system. Auto deletion is implemented to delete older version of RMS managed documents from storage. Auto share is implemented to control who will receive the updated documents. These features can be selectively turned on by the user who publishes a new document.

The version control method according to embodiments of the present invention has the following advantages:

Version control is managed automatically. It can enforce a policy such that users will have access to only the latest version, and older documents may be automatically obsoleted. This is useful, for example, for documents such as a company's price list, to make sure that sales people always use latest price information for quotations. When publishing a new version of a document, the publishing user can control who will receive the new version, so that when the new version becomes available, selected users will receive a notification.

It will be apparent to those skilled in the art that various modification and variations can be made in the DRM system which implements automatic version control described above without departing from the spirit or scope of the invention. Thus, it is intended that the present invention cover modifications and variations that come within the scope of the appended claims and their equivalents.

What is claimed is:

1. A digital rights management method implemented in a server of a digital right management (DRM) system, comprising:
(a) storing a plurality of documents in a document storage;
(b) maintaining a version control database table which includes a plurality of entries, at least some of the entries each corresponding to a document stored in the document storage, each entry of the table including: a unique document identification (ID), a name of a document series which the document belongs to, a version number within the document series, an obsoleted parameter indicating whether the document is obsoleted, and a deleted parameter indicating whether the document is deleted;
(c) receiving a document registration request from a first user to register a new document, the document registration request including, for the new document, a name of a document series which the new document belongs to, a version number within the document series, a plurality of auto-obsolete parameters, each of which corresponding to an older version document in the same document series and indicating whether or not that older version document is to be obsoleted, and a plurality of auto-delete parameters, each of which corresponding to an older version document in the same document series and indicating whether or not that older version document is to be deleted, wherein the plurality of auto-obsolete parameters corresponding to different older version documents are uncorrelated with each other and the plurality of auto-delete parameters corresponding to different older version documents are uncorrelated with each other;
(d) creating a new entry for the new document in the version control database table to store a document ID for the new document, the name of the document series, and the version number received in step (c);

(e) based on the auto-obsolete parameter for the new document received in step (c), modifying one or more existing entries of the version control database table which correspond to one or more documents in the document series of the new document that are indicated by the auto-obsolete parameter, to set their obsoleted parameters to a value indicating that they are obsoleted; and (f) based on the auto-delete parameter for the new document received in step (c), modifying one or more existing entries of the version control database table which correspond to one or more documents in the document series of the new document that are indicated by the auto-delete parameter, to set their deleted parameters to a value indicating that they are deleted, and deleting such one or more documents from the document storage.

2. The method of claim 1, further comprising, for each document ID in the version control database table, storing permission information associated with the document which defines a list of users who have rights to access the document.

3. The method of claim 2, wherein in step (b) each entry of the version control database table further includes a linking parameter indicating whether the new document may be permitted to be accessed in response to a document access request that requests access to one or more older version documents in the same document series and a maximum version difference between the latest version and the older version from which the latest version may be permitted to be accessed, wherein in step (c) the document registration request further includes a linking parameter for the new document, and wherein step (d) further includes storing the linking parameter received in step (c) in the new entry of the version control database table.

4. The method of claim 3, further comprising:
(h) receiving a document access request from a second user to access a document, the document access request including a document ID which identifies the requested document and a user ID which is associated with the second user;
(i) referring to the version control database table using the document ID to determine a version difference between the requested document and a latest version document in the same document series that the requested document belongs to; and
(j) if the version difference is greater than a maximum version difference specified by the linking parameter for the latest version, referring to the stored permission information associated with the requested document to determine whether the second user has rights to access the requested document and transmitting a response to the second user based on the determination, and if the version difference is not greater than the maximum version difference, determining access rights of the second user to the requested document and the latest version document and transmitting another response to the second user based on the determination, the other response being either a response that grants access to the latest version document if the second user has access right to the latest version document regardless of whether the second user has access right to the requested document, or a response that grants access to the requested document if the second user has no access right to the latest version document but has access right to the requested document, or a response that grants no access to either the requested document or the latest version document if the second user has no access right to the latest version document and has no access right to the requested document.

5. The method of claim 2, further comprising:
(h) receiving a document access request from a second user to access a document, the document access request including a document ID which identifies the requested document and a user ID which is associated with the second user; and
(i) referring to the version control database table using the document ID to determine whether the requested document is the latest version in a document series it belongs to, and if it is, referring to the stored permission information associated with the requested document to determine whether the second user has rights to access the requested document and transmitting a response to the second user based on the determination.

6. The method of claim 1, wherein in step (b) each entry of the version control database table further includes an auto-update parameter indicating whether a notification regarding the document is to be sent to users having access rights to the document, wherein in step (c) the document registration request further includes an auto-update parameter for the new document, wherein step (d) further includes storing the auto-update parameter received in step (c) in the new entry of the version control database table, and wherein the method further comprises:
(g) if the auto-update parameter for the new document indicates that a notification regarding the new document is to be sent, sending notifications to users having access rights to the new document.

7. The method of claim 6, wherein in step (b) each entry of the version control database table further includes a document file name and a storage location where the document is stored, wherein in step (c) the document registration request further includes a document file name and a storage location for the new document, wherein step (d) further includes storing the document file name and storage location received in step (c) in the new entry of the version control database table, and wherein in step (g), the notification includes a link which links to the storage location of the new document.

8. The method of claim 1, further comprising:
(h) receiving a document access request from a second user to access a document, the document access request including a document ID which identifies the requested document; and
(i) referring to the version control database table using the document ID to determine whether the obsoleted parameter corresponding to the document ID indicates that the requested document has been obsoleted, and if so, transmitting a response to the second user to deny access to the requested document.

9. The method of claim 1, further comprising:
(h) receiving a document access request from a second user to access a document, the document access request including a document ID which identifies the requested document and a user ID which is associated with the second user;
(i) by referring to the version control database table using the document ID, determining that the requested document is different from a latest version document in the same document series that the requested document belongs to; and (j) determining access rights of the second user to the requested document and the latest version document and transmitting a response to the second user based on the determination, the response being either a response that grants access to the latest version document if the second user has access right to the latest version document regardless of whether the second user has access right to the requested document, or a response that grants access to the requested document if the second user has no access right to the latest version document but has access right to the requested document, or a response that grants no access to either the requested document or the latest version document if the second user has no access right to the latest version document and has no access right to the requested document.

10. A computer program product comprising a non-transitory computer readable storage medium having a computer readable program code embedded therein for controlling a server of a digital right management (DRM) system, the computer readable program code configured to cause the server to execute a digital rights management process, the process comprising:
(a) storing a plurality of documents in a document storage;
(b) maintaining a version control database table which includes a plurality of entries, at least some of the entries each corresponding to a document stored in the document storage, each entry of the table including: a unique document identification (ID), a name of a document series which the document belongs to, a version number within the document series, an obsoleted parameter indicating whether the document is obsoleted, and a deleted parameter indicating whether the document is deleted;
(c) receiving a document registration request from a first user to register a new document, the document registration request including, for the new document, a name of a document series which the new document belongs to, a version number within the document series, a plurality of auto-obsolete parameters, each of which corresponding to an older version document in the same document series and indicating whether or not that older version document is to be obsoleted, and a plurality of auto-delete parameters, each of which corresponding to an older version document in the same document series and indicating whether or not that older version document is to be deleted, wherein the plurality of auto-obsolete parameters corresponding to different older version documents are uncorrelated with each other and the plurality of auto-delete parameters corresponding to different older version documents are uncorrelated with each other;
(d) creating a new entry for the new document in the version control database table to store a document ID for the new document, the name of the document series, and the version number received in step (c);
(e) based on the auto-obsolete parameter for the new document received in step (c), modifying one or more existing entries of the version control database table which correspond to one or more documents in the document series of the new document that are indicated by the auto-obsolete parameter, to set their obsoleted parameters to a value indicating that they are obsoleted; and
(f) based on the auto-delete parameter for the new document received in step (c), modifying one or more existing entries of the version control database table which correspond to one or more documents in the document series of the new document that are indicated by the auto-delete parameter, to set their deleted parameters to a value indicating that they are deleted, and deleting such one or more documents from the document storage.

11. The computer program product of claim 10, wherein the process comprises, for each document ID in the version control database table, storing permission information associated with the document which defines a list of users who have rights to access the document.

12. The computer program product of claim 11, wherein in step (b) each entry of the version control database table further includes a linking parameter indicating whether the new document may be permitted to be accessed in response to a document access request that requests access to one or more older version documents in the same document series and a maximum version difference between the latest version and the older version from which the latest version may be permitted to be accessed, wherein in step (c) the document registration request further includes a linking parameter for the new document, and wherein step (d) further includes storing the linking parameter received in step (c) in the new entry of the version control database table.

13. The computer program product of claim 12, wherein the process further comprises:
(h) receiving a document access request from a second user to access a document, the document access request including a document ID which identifies the requested document and a user ID which is associated with the second user;
(i) referring to the version control database table using the document ID to determine a version difference between the requested document and a latest version document in the same document series that the requested document belongs to; and
(j) if the version difference is greater than a maximum version difference specified by the linking parameter for the latest version, referring to the stored permission information associated with the requested document to determine whether the second user has rights to access the requested document and transmitting a response to the second user based on the determination, and if the version difference is not greater than the maximum version difference, determining access rights of the second user to the requested document and the latest version document and transmitting another response to the second user based on the determination, the other response being either a response that grants access to the latest version document if the second user has access right to the latest version document regardless of whether the second user has access right to the requested document, or a response that grants access to the requested document if the second user has no access right to the latest version document but has access right to the requested document, or a response that grants no access to either the requested document or the latest version document if the second user has no access right to the latest version document and has no access right to the requested document.

14. The computer program product of claim 11, wherein the process further comprises:
(h) receiving a document access request from a second user to access a document, the document access request including a document ID which identifies the requested document and a user ID which is associated with the second user; and (i) referring to the version control database table using the document ID to determine whether the requested document is the latest version in a document series it belongs to, and if it is, referring to the stored permission information associated with the requested document to determine whether the second user has rights to access the requested document and transmitting a response to the second user based on the determination.

15. The computer program product of claim 10, wherein in step (b) each entry of the version control database table further includes an auto-update parameter indicating whether a notification regarding the document is to be sent to users having access rights to the document, wherein in step (c) the document registration request further includes an auto-update parameter for the new document, wherein step (d) further includes storing the auto-update parameter received in step (c) in the new entry of the version control database table, and wherein the process further comprises:

(g) if the auto-update parameter for the new document indicates that a notification regarding the new document is to be sent, sending notifications to users having access rights to the new document.

16. The computer program product of claim 15, wherein in step (b) each entry of the version control database table further includes a document file name and a storage location where the document is stored, wherein in step (c) the document registration request further includes a document file name and a storage location for the new document, wherein step (d) further includes storing the document file name and storage location received in step (c) in the new entry of the version control database table, and wherein in step (g), the notification includes a link which links to the storage location of the new document.

17. The computer program product of claim 10, wherein the process further comprises:

(h) receiving a document access request from a second user to access a document, the document access request including a document ID which identifies the requested document; and (i) referring to the version control database table using the document ID to determine whether the obsoleted parameter corresponding to the document ID indicates that the requested document has been obsoleted, and if so, transmitting a response to the second user to deny access to the requested document.

18. The computer program product of claim 10, wherein the process further comprises:

(h) receiving a document access request from a second user to access a document, the document access request including a document ID which identifies the requested document and a user ID which is associated with the second user;

(i) by referring to the version control database table using the document ID, determining that the requested document is different from a latest version document in the same document series that the requested document belongs to; and (j) determining access rights of the second user to the requested document and the latest version document and transmitting a response to the second user based on the determination, the response being either a response that grants access to the latest version document if the second user has access right to the latest version document regardless of whether the second user has access right to the requested document, or a response that grants access to the requested document if the second user has no access right to the latest version document but has access right to the requested document, or a response that grants no access to either the requested document or the latest version document if the second user has no access right to the latest version document and has no access right to the requested document.

* * * * *